(12) United States Patent
Deisinger et al.

(10) Patent No.: US 9,462,087 B2
(45) Date of Patent: Oct. 4, 2016

(54) AVOIDING COLLISIONS IN INTERNET PROTOCOL (IP) PACKET IDENTIFICATION NUMBERS

(71) Applicants: Mark V. Deisinger, Roseville, MN (US); Allyn D. Smith, Roseville, MN (US)

(72) Inventors: Mark V. Deisinger, Roseville, MN (US); Allyn D. Smith, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 215 days.

(21) Appl. No.: 14/273,720

(22) Filed: May 9, 2014

(65) Prior Publication Data
US 2015/0326603 A1 Nov. 12, 2015

(51) Int. Cl.
*H04L 29/06* (2006.01)

(52) U.S. Cl.
CPC ......... *H04L 69/166* (2013.01); *H04L 63/1441* (2013.01); *H04L 63/1466* (2013.01); *H04L 69/28* (2013.01)

(58) Field of Classification Search
CPC . H04L 69/166; H04L 69/28; H04L 63/1441; H04L 29/06
See application file for complete search history.

(56) References Cited

U.S. PATENT DOCUMENTS

| | | | | |
|---|---|---|---|---|
| 7,373,514 B2* | 5/2008 | Krueger | .................. | G06F 17/10 707/E17.036 |
| 7,925,850 B1* | 4/2011 | Waldspurger | ......... | G06F 9/4856 711/162 |
| 8,782,068 B2* | 7/2014 | Liu | ......................... | H04L 29/06 707/736 |
| 2004/0083369 A1* | 4/2004 | Erlingsson | ........... | G06Q 20/401 713/176 |
| 2006/0133365 A1* | 6/2006 | Manjunatha | ............ | H04L 47/32 370/389 |
| 2010/0215042 A1* | 8/2010 | Sato | ....................... | H04L 12/413 370/392 |

OTHER PUBLICATIONS rfc6274, "Security Assessment of the Internet Protocol Version 4", IETF, Jul. 2011, 75 pages.*
rfc6528, "Defending against Sequence Number Attacks", IETF, Feb. 2012. 12 pages.*
Wikipedia, "Hash table", Apr. 27, 2014, 14 pages.*
Wikipedia, "Connectionless communication", Feb. 26, 2014, 2 pages.*
Wikipedia, "Internet Group Management Protocol", Mar. 20, 2014, 4 pages.*

* cited by examiner

*Primary Examiner* — Brian J Gillis
*Assistant Examiner* — Amy Ling
(74) *Attorney, Agent, or Firm* — Robert P. Marley; Richard J. Gregson (57) ABSTRACT

A pseudo-random generator may be used to generate identification values for formatted data packets. A method for transmitting data less susceptible to man-in-the-middle attacks may include receiving data for transmission over a network according to a protocol; formatting the data into one or more internet protocol (IP) packets by fragmenting the received data; and transmitting the one or more internet protocol (IP) packets. The step of formatting the data into one or more internet protocol (IP) packets may include generating a unique pseudo-random number while avoiding collisions with previously-used numbers; and inserting the pseudo-random number as an identifier in the one or more internet protocol (IP) packets corresponding to the received data.

18 Claims, 5 Drawing Sheets

AVOIDING COLLISIONS IN INTERNET PROTOCOL (IP) PACKET IDENTIFICATION NUMBERS

FIELD OF THE DISCLOSURE

The instant disclosure relates to computer networks. More specifically, this disclosure relates to transferring data over computer networks.

BACKGROUND

Data transfer between devices on a network may involve fragmenting the data into individual chunks of data and formatting those individual chunks of data into data packets with certain header information to assist network equipment in delivering the chunk of data to a desired final destination. When data is fragmented into individual chunks of data, the formatted data packets for the chunks of data may include identifier information to allow a receiving device to match up the chunks of data and recreate the original complete data.

Figure 1:
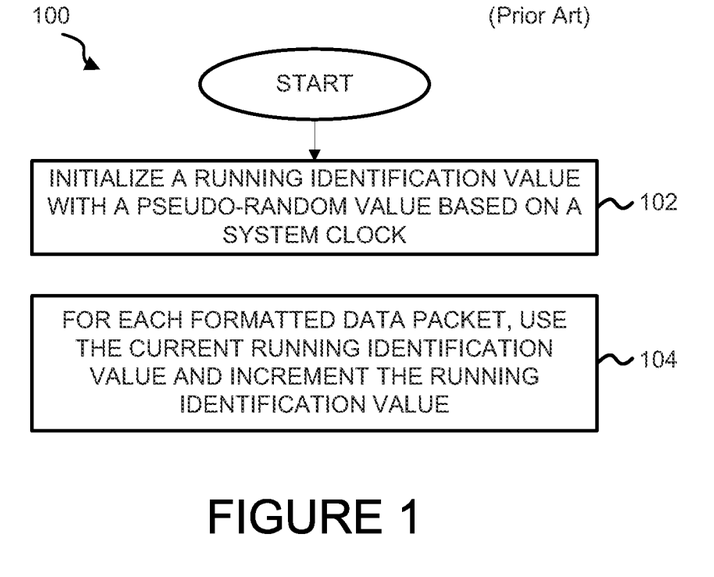
FIG. 1 is a flow chart illustrating a conventional method of formatting data packets.

One conventional method for performing the process of fragmenting data and formatting data packets is shown in FIG. 1. FIG. 1 is a flow chart illustrating a conventional method of formatting data packets. A method 100 begins at block 102 with initializing a running identification value with a pseudo-random algorithm based on a system clock value. At block 104 for each formatted data packet created from data for transmission over the network, the current running identification value is inserted into the formatted data packet. After using the current running identification value, the current running identification value is incremented, such as by adding the number one to the value. Block 104 may continue to be repeated, and the current running identification value incremented for each formatted data packet.

However, the method of FIG. 1 for sending data may leave the receiver open to certain attacks from malicious third parties. For example, because the current identification value is only incremented by one for each formatted data packet, the identification value for future formatted data packets is very predictable. A malicious third party could use the current identification value, extracted from a data packet intercepted on the Internet, to begin sending data packets to the receiver that confuse the receiver and may interrupt services on the receiver. In one particular attack, the receiver is vulnerable to a man-in-the-middle attack.

SUMMARY

A less predictable identification value may be used for formatted data packets to reduce or eliminate the possibility of a malicious third party from successfully tricking a receiver device into accepting packets from the malicious third party. For example, a pseudo-random number generator may be used to generate identification values for formatted data packets. In one embodiment, a pseudo-random number may be generated for an identification value of a first data packet of a series of data packets, and subsequent data packets of the series of data packets use new pseudo-random identification values created for the next series of data packets corresponding to different data.

According to one embodiment, a method may include receiving data for transmission over a network according to a protocol; generating a pseudo-random number; formatting the data into one or more internet protocol (IP) packets; and transmitting the one or more internet protocol (IP) packets. The step of formatting the data into one or more internet protocol (IP) packets may include inserting the pseudo-random number as an identifier in the one or more internet protocol (IP) packets.

According to another embodiment, a computer program product may include a non-transitory computer readable medium having code to perform the steps of receiving data for transmission over a network according to a protocol; generating a pseudo-random number, formatting the data into one or more internet protocol (IP) packets; and transmitting the one or more internet protocol (IP) packets. The step of formatting the data into one or more internet protocol (IP) packets may include inserting the pseudo-random number as an identifier in the one or more internet protocol (IP) packets.

According to yet another embodiment, an apparatus may include a memory and a processor coupled to the memory, wherein the processor is configured to perform the steps of receiving data for transmission over a network according to a protocol; generating a pseudo-random number; formatting the data into one or more internet protocol (IP) packets; and transmitting the one or more internet protocol (IP) packets. The step of formatting the data into one or more internet protocol (IP) packets may include inserting the pseudo-random number as an identifier in the one or more internet protocol (IP) packets.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Data for transmission over a connection in packets, such as internet protocol (IP) packets, may have an identifier number for each of the packets to designate to a receiver where in a sequence of packets the current packet fits. This identifier number may be selected to be a pseudo-random number. For each of the packets transmitted, the triplet of a source address, a destination address, and the identifier value (e.g., the pseudo-random number) may be entered into a collision table. The collision table may be checked for each new packet being formed to ensure that the pseudo-random number is a unique pseudo-random number such that there are no collisions due to, for example, a pseudo-random number generator generating identical numbers in a short span of time. Multiple protocols may be used for transmitting data in packets. According to one embodiment, each protocol may use identifier values generated by the pseudo-random number generator independent of each other to reduce or eliminate the likelihood of wrapping values. The formatted data in IP packets with an identifier selected by a pseudo-random number generator may be formatted in IPv4 packets and/or IPv6 packets.

Figure 2:
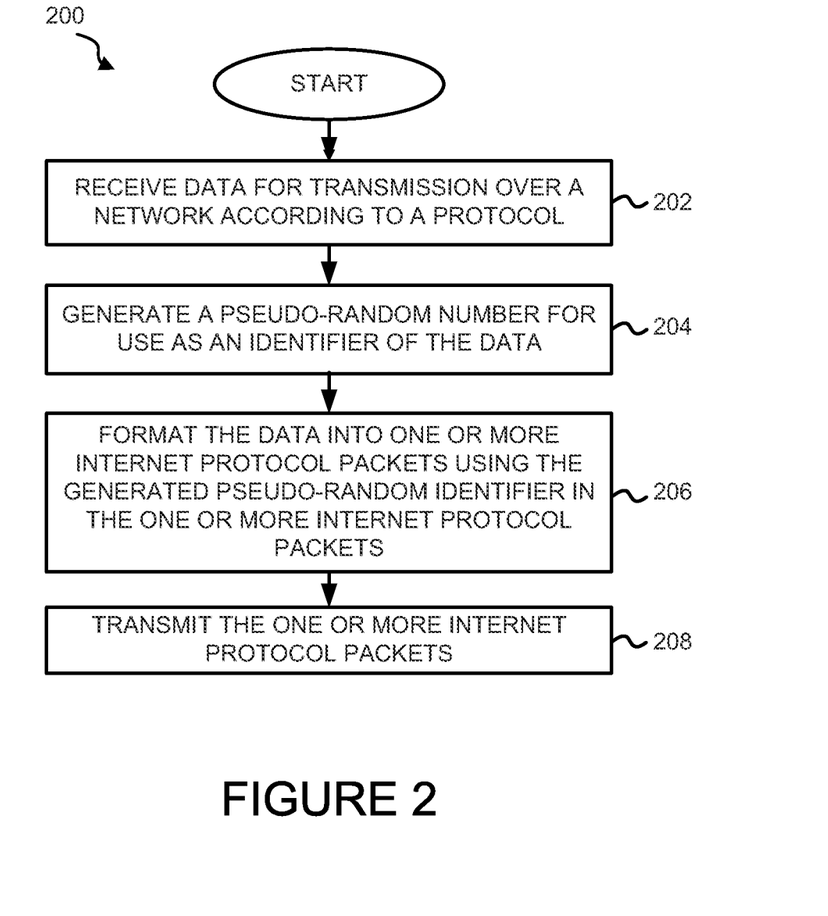
FIG. 2 is a flow chart illustrating a method for transmitting data in internet protocol (IP) packets according to one embodiment of the disclosure.

FIG. 2 is a flow chart illustrating a method for transmitting data in internet protocol (IP) packets according to one embodiment of the disclosure. A method 200 may begin at block 202 with receiving data for transmission over a network according to a protocol. For example, data may be received for transmission across a network according to a transmission control protocol (TCP), user datagram protocol (UDP), internet gateway messaging protocol (IGMP), simple network management protocol (SNMP), or other protocol. The data received at block 202 may be too large for packaging in a single IP packet. Thus, the data of block 202 may be fragmented into multiple IP packets.

At block 204, a pseudo-random number may be generated for use as an identifier of the data received at block 202. At block 206, the data may be formatted into one or more packets, such as internet protocol (IP) packets, using the generated pseudo-random identifier in the one or more packets. Each of the packets of the one or more packets corresponding to the data received at block 202 may include the generated pseudo-random number identifier of block 204. At block 208, the one or more packets may be transmitted to a receiving party over a network, such as an intranet or the Internet. The receiving party may recreate the data of block 202 by assembling the packets using the identifier values in the one or more packets.

The method 200 of FIG. 2 may be repeated for additional data received at a network interface for transmission in IP packets, whether IPv4 or IPv6 packets. A new pseudo-random number may be generated for the next sequence of fragmented data packets corresponding to the new received data. In one embodiment, the next received data for fragmentation may be formatted into IP packets with an incremented identifier value from the previously-generated pseudo-random number. A new pseudo-random number may then be generated after every received data block.

According to one embodiment, the IP packets are IPv6 packets. An initial value for the identifier of the IP packets may be selected through a pseudo-randomization algorithm without the use of a clock time. As new IP packets are formatted from data for transmission on the network, the identifier may be generated through the pseudo-randomization algorithm to get new IPv6 fragmentation identifiers for the fragmented outgoing datagrams of the IP packets. In one embodiment, transmission control protocol (TCP) packets may not be fragmented. Since there is no IP identifier in a non-fragmented packet for IPv6 and IP identifiers are not generated, adjustments to the pseudo-random number generation to avoid issues with segmentation offloading may be suppressed.

According to another embodiment, the IP packets are IPv4 packets. Pseudo-random numbers may be generated for identifier values in all IPv4 packets, including TCP, UDP, ICMP, and IGMP protocol data.

In one embodiment for fragmented datagrams, the next randomized identifier value may be selected from a data structure maintained for each combination of local and remote address, and that value used for both a fragmentation header in the IPv4 or IPv6 packet and to reset the data structure value. A route table is a controlling data structure for sending data. There may be one route table for each combination of local address and remote address. In our implementation, each route table maintains a set of "use this value next" values for setting the IP ID—one for UDP, one for IGMP, and so on. On a per-activity or per-thread basis, the route tables may be collected under a controlling data structure called a route table header. In another embodiment, the value may be stored in individual route tables.

A list of recently used identifier values may be maintained in a routing table for each protocol. On a per-activity or -thread basis, maintain a fragmented-datagram collision array shared by UDP, ICMP, and IGMP. The activity allocates and makes the array available during initialization. Each activity also maintains a simple counter of the number of fragmented output datagrams that have not yet timed out.

A collision array or table may be maintained for recently used identifiers, possibly on a per-activity basis, in which the array or table may include a source address and a destination address for each used identifier. Further, each entry in the array or table may include a protocol identifier (e.g., UDP, ICMP, or IGMP), a time stamp, and pointers to implement a linked list, which may be chained off an indexed entry into the collision array. When an output datagram, such as UDP, ICMP, or IGMP, is fragmented, a computer system formatting the data in IP packets may allocate or reuse, based on a predetermined timeout value, a structure for attachment to the collision array. The predetermined timeout value may be, for example, approximately thirty seconds.

The collision array or table may be used to reduce the likelihood that an IP packet identifier value is reused within a certain period of time due to the pseudo-random number generator generating the same value within a short period of time. The collision array or table may be checked each time an IP packet is formatted to determine whether a collision has occurred. In one embodiment, TCP packets may not be fragmented. Thus, checking the collision table or array may be skipped for TCP packets. For data formatted according to the TCP protocol, a sending system may generate randomized numbers as needed, taking potential segmentation offloading into account to avoid overlap.

Segmentation offloading is offloading of segmentation in a layer four protocol, such as TCP, in software to network interface card (NIC) firmware. When segmentation is active but segmentation offloading is not active, the TCP layer may break a message into segments and pass them down to the IP layer, which then may also fragment the segments before sending them to the NIC, which sends them across the network. When segmentation offloading is active, TCP sends a message down to the IP layer. Even for a large message, IP sends the message as a single unit to the NIC, which then does the segmentation and sends the segments across the network. When the NIC performs segmentation, the NIC may break the message into multiple packets and assign each a unique IP Identifier to delineate them. When segmentation offloading is active for an out-going TCP datagram, the randomization code may be adjusted to allow a jump beyond the incremental values the segmentation offloading will use.

Figure 3:
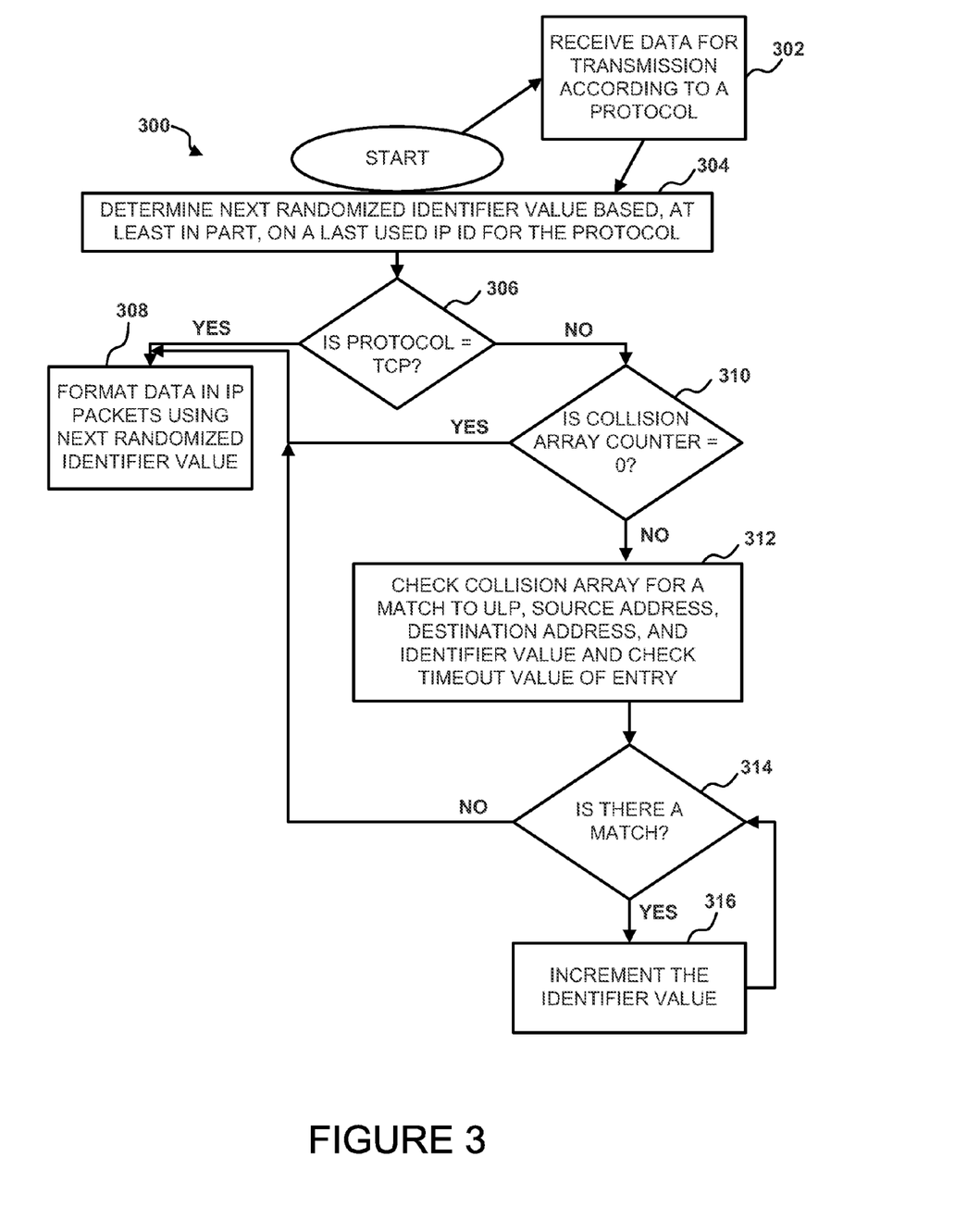
FIG. 3 is a flow chart illustrating a method for transmitting data in internet protocol (IP) packets according to another embodiment of the disclosure.

One example of formatting data packets with the use of a collision table or array is shown in FIG. 3. FIG. 3 is a flow chart illustrating a method for transmitting data in internet protocol (IP) packets according to another embodiment of the disclosure. A method 300 may begin at block 302 with receiving data for transmission according to a protocol. At block 304, a next randomized identifier value may be determined based, at least in part, on a last used identifier for the protocol of the data. That is, each protocol being used to transmit data may have a separate next identifier value. In one embodiment, the next randomized identifier value may be the next value generated by the same pseudo-random generator algorithm used to generate the last used identifier. In another embodiment, the next randomized identifier value may be calculated from the last used identifier value by adding, multiplying, subtracting, or dividing the last used identifier value according to a pre-determined algorithm. At block 306 it is determined whether the protocol for data received at block 302 is TCP. If yes, then the method 300 proceeds to block 308 to format the data of block 302 into packets using the next randomized identifier value of block 304. If the protocol is not TCP, then the method 300 proceeds to block 310.

At block 310 it is determined whether a collision array counter is zero. If yes, then the collision array is empty and the method 300 proceeds to block 308 to format the data into packets using the next randomized identifier value of block 304. If the collision array counter of block 310 is not zero, indicating there are entries in the array, then the method 300 proceeds to block 312. At block 312, the collision array is checked for a match to the data received at block 302. For example, the check may include comparing at least one of a Upper Layer Protocol (ULP), a source address, a destination address, and the determined randomized identifier value of block 304 with entries in the collision array. It is determined at block 314 whether any entry in the collision array matches the current data being formatted for transmission. If there is a match, a timeout value of the match may also be checked to determine whether the matching entry has expired. If there is no match to an unexpired entry, then the method 300 may proceed to block 308 to format the data in packets using the determined next randomized identifier value of block 304. If there is a match, then the method 300 may proceed to block 316 to increment the identifier value. Incrementing may include adding a predetermined value, such as one, to the identifier value of block 304, or performing other pre-determined mathematical operations on the identifier value of block 304. The step at block 316 may be repeated until there is no match at block 314, after which the method 300 proceeds to block 308 to format the data in packets using the incremented identifier value of block 316.

Figure 4:
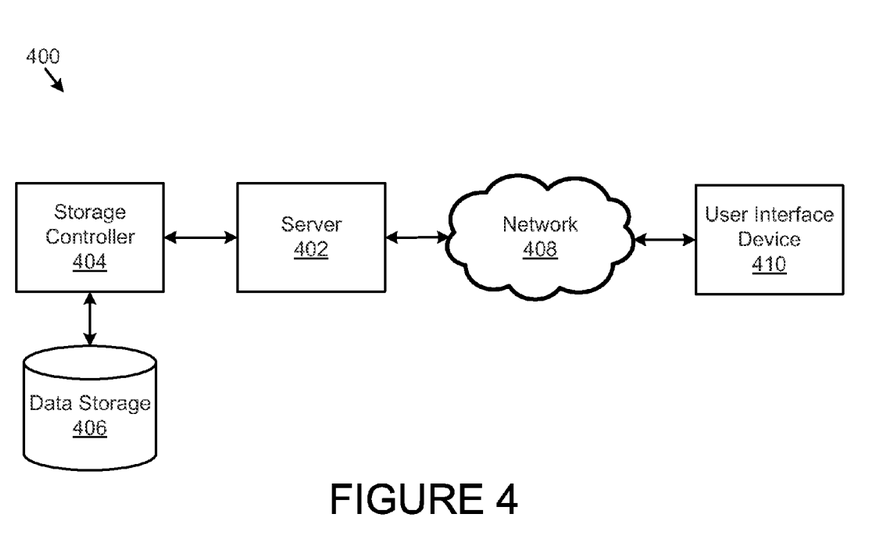
FIG. 4 is a block diagram illustrating a computer network according to one embodiment of the disclosure.

FIG. 4 illustrates one embodiment of a system 400 for an information system. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface, such as to adjust settings or view the collision array or table.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
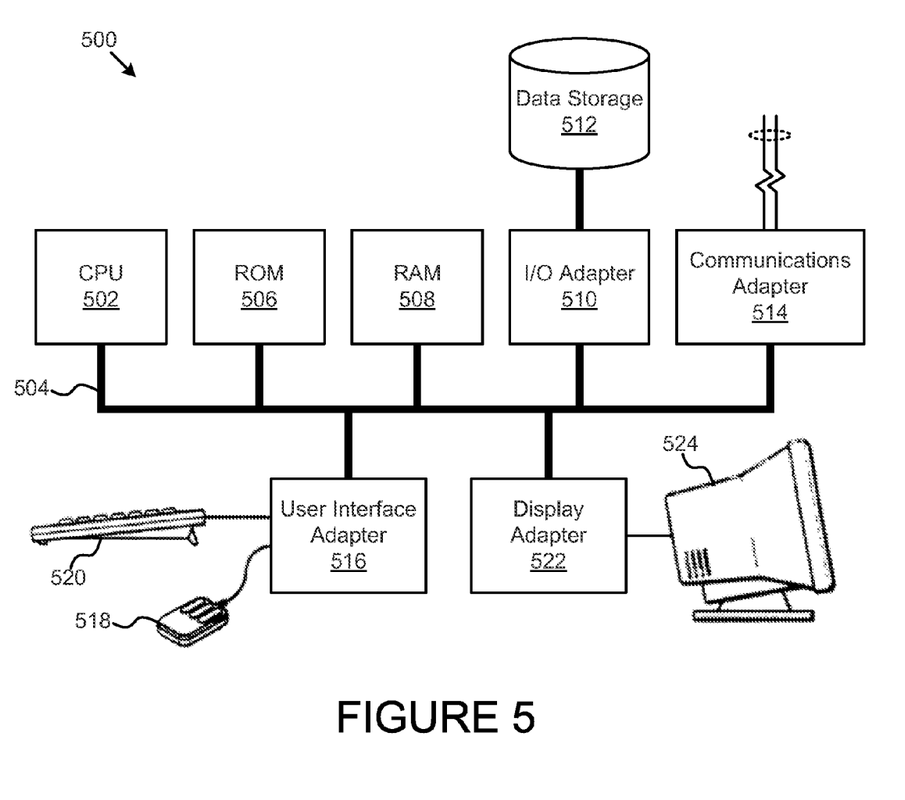
FIG. 5 is a block diagram illustrating a computer system according to one embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

If implemented in firmware and/or software, the functions described above, such as described with reference to FIG. 2 and FIG. 3, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented method for providing secure communications over a network having data packets with identification IDs, the method, comprising:
   receiving, at a processor, data for transmission over a network coupled to a communications adapter according to a protocol;
   generating, by the processor, a pseudo-random number;
   formatting, by the processor, the data into one or more internet protocol (IP) packets, wherein the step of formatting the data into one or more internet protocol (IP) packets comprises inserting the pseudo-random number as an identifier in the one or more internet protocol (IP) packets;
   after generating the pseudo-random number, comparing the pseudo-random number, a source address, and a destination address with a collision table; and
   when a collision is identified for the generated pseudo-random number, the source address, and the destination address; incrementing the pseudo-random number until no collision is identified for the incremented pseudo-random number;
   transmitting, through the communications adapter under control of the processor, the one or more internet protocol (IP) packets;
   wherein the collision table comprises a protocol identifier, a time stamp, and pointers to implement a linked list, which may be chained off an indexed entry into the collision array.

2. The method of claim 1, wherein the step of formatting the data comprises generating a pseudo-random number for a first packet of the one or more internet protocol (IP) packets without accessing a clock.

3. The method of claim 1, wherein the step of formatting the data comprises generating the pseudo-random number based, at least in part, on a last used identifier for the protocol.

4. The method of claim 1, wherein
   the protocol identifier in the collision table comprises one of the following protocols: TCP, UDP, ICMP, and IGMP.

5. The method of claim 4, Wherein the step of formatting the data further comprises:
   when no collision is identified, inserting into the collision table a new entry comprising the pseudo-random number, the source address, and the destination address into the collision table; and
   after a timeout period, deleting the new entry from the collision table.

6. The method of claim 4, wherein the step of formatting the data further comprises skipping the comparing step when the protocol for the received data is transmission control protocol (TCP).

7. The method of claim 1, wherein the step of formatting comprises:
   receiving additional data for transmission over the network;
   generating a second pseudo-random number; and
   formatting the additional data into one or more additional internet protocol (IP) packets, wherein the step of formatting the data comprises inserting the second pseudo-random number as an identifier in the one or more additional internet protocol (IP) packets.

8. A computer program product containing encoded data that when read into a computing device and executed as a series of instruction implements a method for providing secure communications over a network having data packets with identification IDs, the method, comprising:
a non-transitory computer readable medium comprising code to perform the steps comprising:
receiving data for transmission over a network according to a protocol;
generating a pseudo-random number;
formatting the data into one or more internet protocol (IP) packets,
wherein the step of formatting the data into one or more internet protocol (IP) packets comprises inserting the pseudo-random number as an identifier in the one or more internet protocol (IP) packets; and
after generating the pseudo-random number, comparing the pseudo-random number, a source address, and a destination address with a collision table; and
when a collision is identified for the generated pseudo-random number, the source address, and the destination address; incrementing the pseudo-random number until no collision is identified for the incremented pseudo-random number;
transmitting the one or more internet protocol (IP) packets;
wherein the collision table comprises a protocol identifier, a time stamp, and pointers to implement a linked list, which may be chained off an indexed entry into the collision array.

9. The computer program product of claim 8, wherein the step of formatting the data comprises generating a pseudo-random number for a first packet of the one or more internet protocol (IP) packets without accessing a clock.

10. The computer program product of claim 8, wherein the protocol identifier in the collision table comprises one of the following protocols: TCP, UDP, ICMP, and IGMP.

11. The computer program product of claim 10, wherein the step of formatting the data further comprises:
when no collision is identified, inserting into the collision table a new entry comprising the pseudo-random number, the source address, and the destination address into the collision table; and
after a timeout period, deleting the new entry from the collision table.

12. The computer program product of claim 10, wherein the step of formatting the data further comprises skipping the comparing step when the protocol for the received data is transmission control protocol (TCP).

13. The computer program product of claim 8, wherein the step of formatting the data further comprises:
receiving additional data for transmission over the network;
generating a second pseudo-random number; and
formatting the additional data into one or more additional internet protocol (IP) packets, wherein the step of formatting the data comprises inserting the second pseudo-random number as an identifier in the one or more additional internet protocol (IP) packets.

14. An apparatus, comprising:
a memory;
a communications adapter; and
a processor coupled to the memory and the communications adapter, wherein the processor is configured to perform the steps comprising:
receiving data for transmission over a network coupled to the communications adapter according to a protocol;
generating a pseudo-random number;
formatting the data into one or more internet protocol (OP) packets,
wherein the step of formatting the data into one or more internet protocol (IP) packets comprises inserting the pseudo-random number as an identifier in the one or more internet protocol (IP) packets;
after generating the pseudo-random number, comparing the pseudo-random number, a source address, and a destination address with a collision table; and
when a collision is identified for the generated pseudo-random number, the source address, and the destination address; incrementing the pseudo-random number until no collision is identified for the incremented pseudo-random number; and
transmitting, through the communications adapter, the one or more internet protocol (IP) packets;
wherein the collision table comprises a protocol identifier, a time stamp, and pointers to implement a linked list, which may be chained off an indexed entry into the collision array.

15. The apparatus of claim 14, wherein the step of formatting the data comprises generating a pseudo-random number for a first packet of the one or more internet protocol (IP) packets without accessing a clock.

16. The apparatus of claim 14, wherein
the protocol identifier in the collision table comprises one of the following protocols: TCP, UDP, ICMP, and IGMP.

17. The apparatus of claim 16, wherein the step of formatting the data further comprises:
when no collision is identified, inserting into the collision table a new entry comprising the pseudo-random number, the source address, and the destination address into the collision table; and
after a timeout period, deleting the new entry from the collision table.

18. The apparatus of claim 14, wherein the step of formatting the data further comprises:
receiving additional data for transmission over the network;
generating a second pseudo-random number; and
formatting the additional data into one or more additional internet protocol (IP) packets, wherein the step of formatting the data comprises inserting the second pseudo-random number as an identifier in the one or more additional internet protocol (IP) packets.

* * * * *